Aug. 10, 1965  E. A. JOHNSON  3,199,144

CATTLE HOLD DOWN DEVICE

Filed Dec. 3, 1964

INVENTOR.
EDWARD ARVID JOHNSON
BY

United States Patent Office 3,199,144
Patented Aug. 10, 1965

3,199,144
CATTLE HOLD DOWN DEVICE
Edward Arvid Johnson, Transcona, Manitoba, Canada,
assignor to Lejohn Sales Ltd., Winnipeg, Manitoba,
Canada
Filed Dec. 3, 1964, Ser. No. 415,638
12 Claims. (Cl. 17—44)

My invention relates to new and useful improvements in cattle hold down devices, particularly devices adapted to brace the hind legs of cattle downwardly when said cattle are suspended from an overhead rail ready for processing.

An example of such processing is exemplified by my U.S. Patent No. 3,129,454.

In that application, chains are secured to the hind legs of the carcass and are engaged upon a hold down device.

However, due to the different sizes of cattle, certain vertical adjustment is necessary in this hold down device in order that the carcass may be tensioned and held firmly while being processed.

The principal object and essence of my invention is therefore to provide a device of the character herewithin described to which the hind legs of a carcass may be secured by chains or the like and in which the device may be moved downwardly to a position in which the carcass is tensioned and in which the hold down device locks in this position.

Another object of the invention is to provide a device of the character herewithin described which holds the carcass firmly while, for example, hide pulling is taking place and then maintains the carcass in the desired position so that further processing may be undertaken.

Another object of the invention is to provide a device of the character herewithin described which is easily manipulated by one operator who can tension the carcass and release same as soon as it is ready for moving to the next stage.

Yet another object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodiment in the method, process, construction, arrangement of parts, or new use of the same, as herein particularly exemplified in one or more specific embodiments of such concept, reference being had to the accompanying figures in which.

In the drawings like characters of reference indicate corresponding parts in the different figures.

Figure 1:
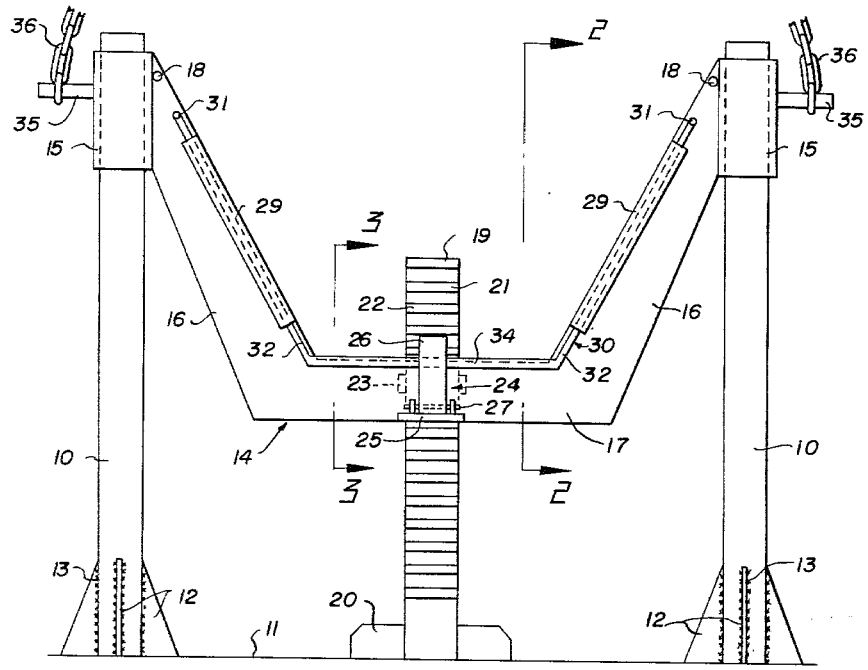
FIGURE 1 is a front elevation of my device.

Proceeding therefore to describe my invention in detail, reference character 10 illustrates a pair of spaced and parallel cylindrical support posts anchored within the supporting surface 11 and braced by means of flanges 12 which may be welded thereto as indicated at 13.

A cross head selectively designated 14 is situated between the support posts 10 and is provided with a pair of vertical sheaves 15 slidably engageable upon the posts 10 and reciprocal vertically thereon.

Downwardly and inwardly inclined members 16 extend from the sheaves 15 and terminate in a transverse center section 17 all of which is manufactured from a steel plate or the like.

Handles 18 extend outwardly from adjacent the sheaves 15 and enable an operator to move the cross head vertically upwardly or downwardly as desired.

A centrally located vertically situated ratchet bar or post 19 is also secured to the supporting surface 11 by means of bracket 20, said ratchet post being provided with a plurality of ratchet teeth 21 upon the face 22 thereof.

Figures 2, 3:
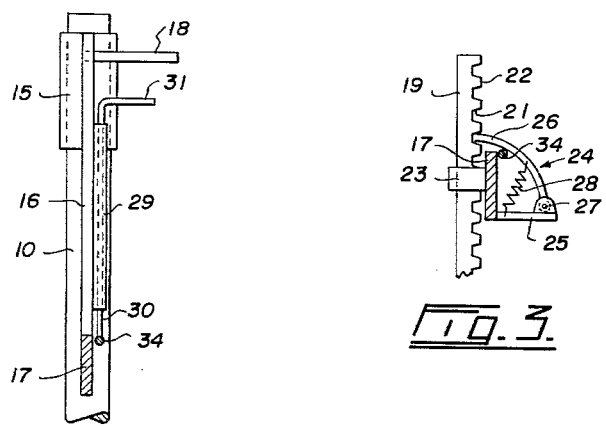
FIGURE 2 is a fragmentary view substantially along the line 2—2 of FIGURE 1.
FIGURE 3 is a fragmentary side elevation showing the ratchet means and ratchet post substantially along the line 3—3 of FIGURE 1.

Extending rearwardly from the central section 17 of the cross head is a bracket 23 which extends around the ratchet post as shown in FIGURES 3 and guides the cross head when same is being moved vertically.

Ratchet means collectively designated 24 are provided to selectively lock the cross head in position desired, said ratchet means being shown in detail in FIG. 3.

It consists of an offstanding bracket 25 extending from the center section 17 and is provided with an arcuately curved paul 26 pivotally secured to the bracket 25 by means of pivot pin 27, said paul extending upwardly and towards the ratchet teeth 21 as clearly illustrated.

A spring 28 extends between the paul 26 and the bracket 25 and normally maintains the paul in engagement with the ratchet teeth 21.

Situated upon the diagonal portions 16 is a pair of guides 29 through which engages a ratchet release rod 30 terminating at the upper end thereof in manipulating handles 31 which extend outwardly adjacent the operating handles 18.

This rod, which includes the two side portions 32 thereof, extends transversely across the center section and above same as indicated by the reference character 34. It passes under the arcuately curved paul 26 as shown in FIGURE 3 and upward movement of the handle 31 causes the central portion 34 of the ratchet release rod to raise the paul clear of the ratchet teeth against pressure of spring 28 so that the device can be moved upwardly.

Spindles or rods 35 extend outwardly from each sheave 15 to which may be attached chains 36 secured to the hind legs of the carcass.

In operation, the device is situated in the uppermost position illustrated whereupon the chains are engaged over the rods 35, said chains having been secured to the hind legs of the carcass (not illustrated).

Downward pressure upon handles 18 causes the cross head to move downwardly thus tensioning the carcass, the ratchet paul 26 engaging the teeth 21 and preventing upward movement of the cross head.

After processing, the ratchet release rod 31 is raised thus disengaging the ratchet so that the cross head can be moved to the uppermost position ready to receive the next succeeding carcass.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:
1. A device for holding down the hind legs of cattle suspended from an overhead rail substantially vertically for processing purposes; comprising in combination a pair of spaced and parallel vertically situated main support members, a cross head extending between said members and being reciprocal vertically thereon, means on each side of said cross head for anchoring the hind legs of cattle thereto, a ratchet post situated between said support members and extending vertically, ratchet means on said cross head cooperating with said ratchet post for detachably holding said cross head against upward vertical movement, and means on said cross head for selectively releasing said ratchet means.

2. The device according to claim 1 in which said cross head is provided with sheaves on each end thereof bearably engaging said support posts.

3. The device according to claim 2 which includes a bracket extending from said cross head around said ratchet post for guiding said cross head vertically.

4. The device according to claim 3 in which said ratchet means includes a support bracket extending outwardly from said cross head, a spring-loaded paul pivotally secured by one end thereof to said bracket, the upper end of said paul engaging said ratchet post.

5. The device according to claim 4 in which said means for selectively releasing said ratchet means includes a rod transversely situated on said cross head under said paul, said rod being movable vertically to engage said paul and lift said paul clear of said ratchet post.

6. The device according to claim 2 in which said ratchet means includes a support bracket extending outwardly from said cross head, a spring-loaded paul pivotally secured by one end thereof to said bracket, the upper end of said paul engaging said ratchet post.

7. The device according to claim 6 in which said means for selectively releasing said ratchet means includes a rod transversely situated on said cross head under said paul, said rod being movable vertically to engage said paul and lift said paul clear of said ratchet post.

8. The device according to claim 1 which includes a bracket extending from said cross head around said ratchet post for guiding said cross head vertically.

9. The device according to claim 8 in which said ratchet means includes a support bracket extending outwardly from said cross head, a spring-loaded paul pivotally secured by one end thereof to said bracket, the upper end of said paul engaging said ratchet post.

10. The device according to claim 9 in which said means for selectively releasing said ratchet means includes a rod transversely situated on said cross head under said paul, said rod being movable vertically to engage said paul and lift said paul clear of said ratchet post.

11. The device according to claim 1 in which said ratchet means includes a support bracket extending outwardly from said cross head, a spring-loaded paul pivotally secured by one end thereof to said bracket, the upper end of said paul engaging said ratchet post.

12. The device according to claim 11 in which said means for selectively releasing said ratchet means includes a rod transversely situated on said cross head under said paul, said rod being movable vertically to engage said paul and lift said paul clear of said ratchet post.

No references cited.

SAMUEL KOREN, *Primary Examiner.*